Aug. 1, 1939.  M. N. PACK  2,168,045
AUTOMATIC VOLUME CONTROL
Filed Dec. 30, 1936  2 Sheets-Sheet 1
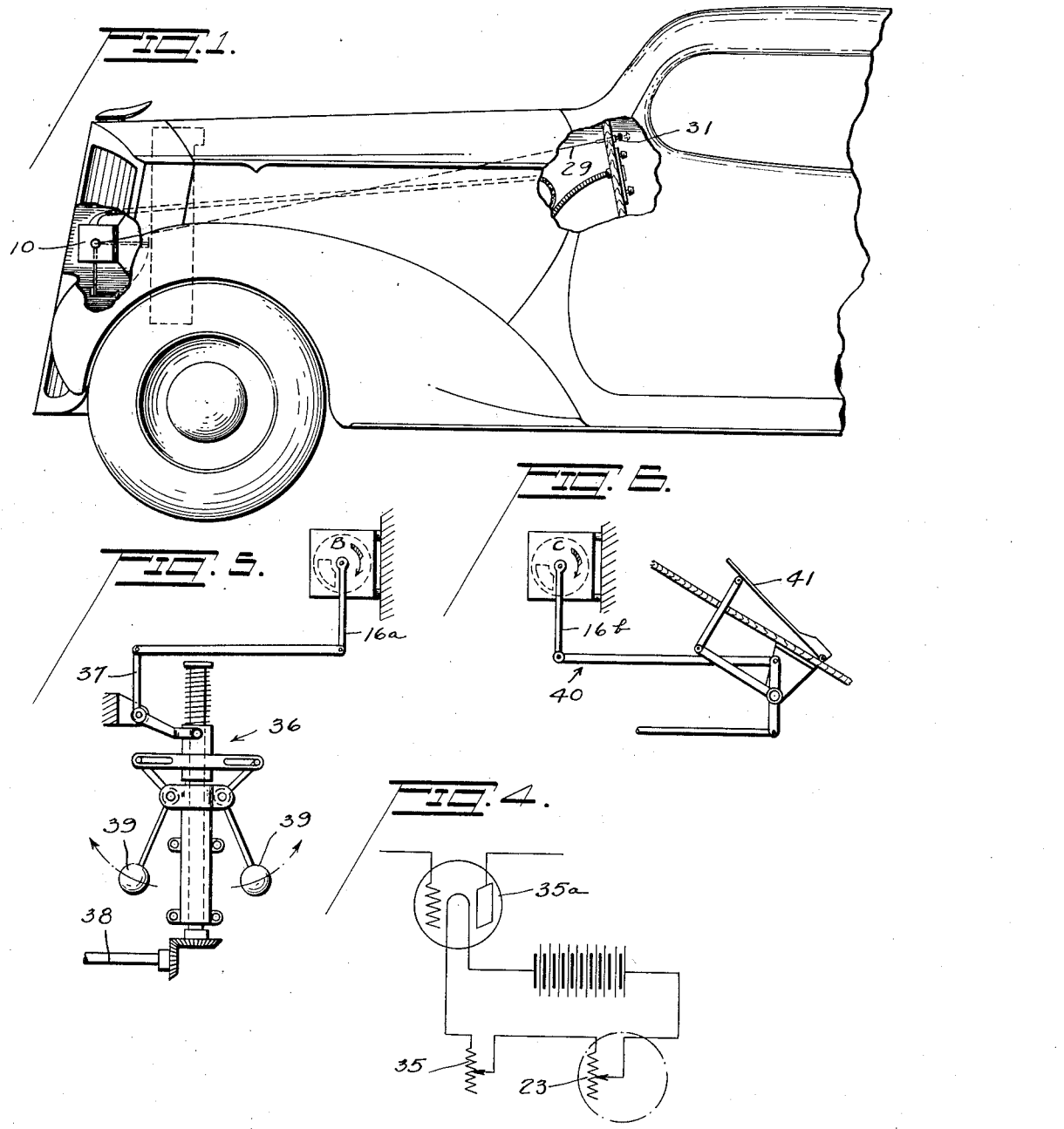
INVENTOR
Mendel N. Pack Aug. 1, 1939.  M. N. PACK  2,168,045
AUTOMATIC VOLUME CONTROL
Filed Dec. 30, 1936  2 Sheets-Sheet 2
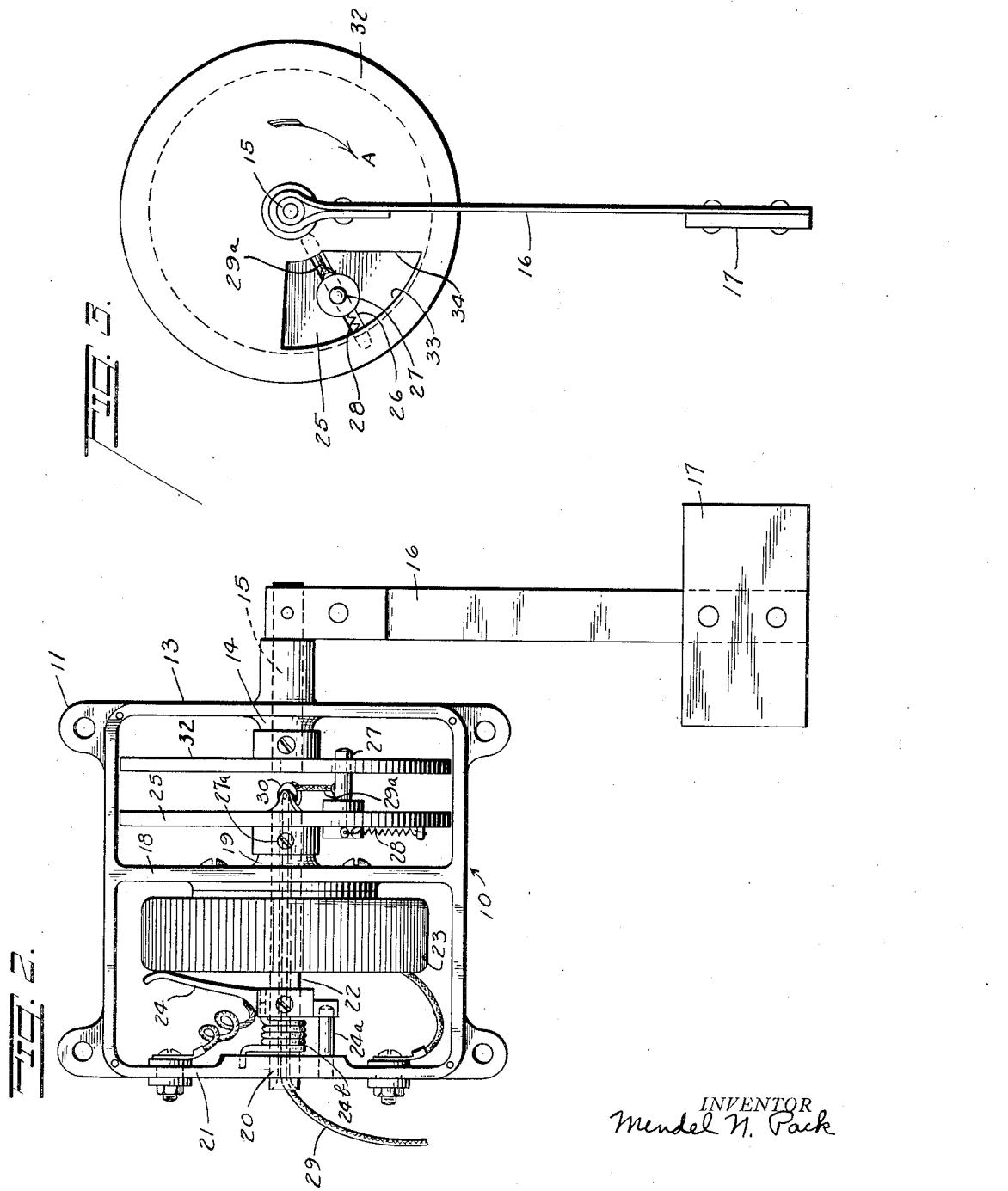
INVENTOR
Mendel N. Pack Patented Aug. 1, 1939

2,168,045

UNITED STATES PATENT OFFICE 2,168,045

AUTOMATIC VOLUME CONTROL

Mendel N. Pack, Dayton, Ohio

Application December 30, 1936, Serial No. 118,243

15 Claims. (Cl. 250—20)

The present invention relates generally to volume controls for radio receivers and more particularly to automatic volume controls adapted for use in radio receivers installed upon moving vehicles, such for example, as automobiles, aircraft, trains and the like.

The invention is particularly useful in the case of automobile receivers wherein simplification of the controls facilitates and makes more satisfactory the operation of the receiver while driving. In existing automobile radio receivers the "standard" volume control ordinarily consists of a manually operated resistance element, the controlling knob of which is positioned upon the radio control panel mounted upon the automobile instrument board. This "standard" volume control is adjustable by the radio operator to a position to obtain the most desirable volume of tone from the amplifiers, its setting being dependent upon the intensity of existing extraneous noises emanating from the passing airstream, the din of passing traffic, engine vibrations and other causes.

As the speed of the vehicle is increased, a corresponding increase in the volume of some of the disturbing noises occurs, the tendency of which is to drown or dampen out the signals emanating from the receiver. This condition is generally rectified by the radio operator adjusting the "standard" volume control to effect an increase in the volume of the signals sufficient to compensate for the extraneous noises. Then, if the speed of the vehicle is decreased, the intensity of the disturbing noises will be decreased and make the volume of tone emitted by the radio receiver, for the same volume control setting, so great as to be disturbing to the occupants of the vehicle. In any event repeated and varied adjustment of the "standard" volume control is required to meet such changing conditions in order to obtain the desired reception. Not only is this an inconvenience but it detracts the attention of the driver from the proper operation of the vehicle.

It is therefore an object of the present invention to provide novel means for quickly and readily obtaining the reception best adapted for a given purpose.

Another object of the present invention is to provide new and novel means for adjusting the amplifiers of an automobile radio receiver for any given condition incident to the operation of said automotive vehicle.

A further object of the present invention is to provide means for automatically increasing or decreasing the volume of tone emanating from an automobile radio receiver, thereby avoiding the necessity of consciously advancing or retarding the "standard" volume control to a different setting for every changing condition.

A still further object of the present invention is to provide a fluid operated remote control device capable of automatically varying the volume of tone emanating from an automobile radio receiver, said device including a controlled and a controlling part movable into operative relationship at any predetermined speed of operation of said vehicle by changes in the velocity of a fluid current to which said controlling part may be subject.

These and other objects and advantages of the invention will be apparent from the following detailed description when taken in connection with the accompanying drawings in which:

Figure 1 is a schematic drawing illustrating my automatic volume control installed upon an automotive vehicle.

Figure 2 is an enlarged detail front elevation of the automatic volume control per se.

Figure 3 is a side elevation showing the relation of the parts illustrated in Figure 2.

Figure 4 is a circuit diagram of the invention.

Figure 5 illustrates the volume control device operated by a governor arrangement and Figure 6 illustrates a method of operating the volume control device from the engine throttle control.

Referring more particularly to the drawings wherein corresponding parts are designated by like numerals throughout the several views, the controlling device in the present preferred embodiment of my invention herein illustrated generally comprises a casing 10 provided with ears 11, each ear having an opening therein adapted for receiving screws (not shown) for mounting the device in any convenient position on the vehicle framework.

In the present instance, for the purposes of illustration only, I have shown the device mounted in the space between the radiator and grill of a modern automobile, and in a position to be acted upon by the airstream passing through the radiator core. By locating my controlling unit in the space between the grill and radiator the following advantages are obtained: (a) With the vehicle stationary and the engine running at idling speed, and with the "standard" volume control adjusted to best suit the existing conditions, any increase in speed of the engine will effect a simultaneous increase in the flow of air which is drawn through the radiator core and operate said device to automatically increase the volume of tone emanating from the radio receiver and thus compensate for the increased engine noises; (b) Increase in engine noises, caused by shifting from an intermediate to a higher gear speed ratio, causing the flow of air through the radiator to increase will effect an automatic response in the operation of my device and automatically increase the volume of tone emanating from the radio receiver during the time of gear shifting to thereby maintain the reception at a desired value.

It is to be understood however that, although I have shown the automatic control device so mounted between the radiator and grill of the automobile, the device is equally well adaptable to other convenient locations. That is to say, it may be located under the hood of the vehicle, or positioned directly to the body framework beneath the floor boards without detracting from its usefulness.

The one wall 13 of the casing is provided with a bearing portion 14 in which is rotatably mounted a stub shaft 15, the one end of said shaft extending exteriorly of the casing 10 to provide a mounting means for a depending arm 16. This arm is provided at its lower or swinging end with a paddle or vane 17 so positioned as to be acted upon by the surrounding airstream and effect a swinging of the arm 16, and consequently a rotation of the shaft 15 in the direction of the arrow A as illustrated in Figure 3.

The casing 10 is further provided with an inner partition or web portion 18 which is provided with a bearing portion 19, said bearing portion not only being in axial alignment with a companion bearing portion 20, formed in the opposite wall 21 of the casing 10, but in axial alignment with the bearing portion 14, heretofore mentioned.

Rotatably mounted in the bearing portions 19 and 20 is the control shaft 22 of a resistance element 23 that is mounted on the web portion 18 aforesaid, the control arm 24 of which is suitably secured to and rotatable with the shaft 22. Movement of the control arm from its position of rest against a stop 24a provided in the wall 21 is resisted by a torsion spring 24b, illustrated in Figure 2.

The inner end of the shaft 22 has fixedly mounted thereon a disc 25 provided with a radial slot 26. A pin 27 projecting outwardly from the disc 25 is guided radially in the slot 26. The pin 27 is acted upon by a spring 28 tending to move it radially outward from the center of the control shaft 22. The movement of the pin outwardly from the center of the control shaft is restrained by a control wire or cable 29 fixed to the pin at 29a, said wire first passing over a pulley 30 mounted centrally of the disc 25, and thereafter extending through the hollow center of the control shaft 22 and leading to a pull out knob 31 which is conveniently mounted upon the instrument board of the vehicle, adjacent the radio tuning controls.

The stub shaft 15 has fixedly mounted at its inner end a second disc 32 positioned adjacent to and coaxially arranged with respect to the disc 25. This disc 32 is provided with a segmental aperture 33 within which the pin 27 projects, the one end of said aperture forming a contacting or bearing face, indicated at 34 which is adapted for engaging and moving the pin 27, and consequently the control arm 24, upon rotation of the stub shaft 15.

In the present instance this contacting face is shown straight but it is to be understood that its contour may be varied to obtain best operating conditions of the control device without departing from the spirit of the invention.

Normally the relation of the parts is as illustrated in Figure 3; that is to say, with the control arm 24 at its position of rest against the stop 24a, and the vane 17 depending downwardly, and with the pin 27 on the disc 25 spaced a predetermined distance from the contacting face 34 on the disc 32, said spacing being determined by experimentation to ascertain the average speed at which the device should begin to operate, the setting of the disc 25 at the desired angular position on the shaft 22 being accomplished by means of the screw 27a. Consequently, if the disc 32 is rotated through a predetermined angle in the direction indicated by the arrow A, Figure 3, caused by a movement of the vane 17 in response to the velocity of the airstream to which it is subject, the bearing face 34 will make contact with the pin 27 and rotate the disc 25, which in turn will rotate the control arm 24, thus changing the electrical resistance of the element 23.

As shown in Figure 4, by way of illustration only, the resistance element 23 may be conveniently connected in series with the "standard" volume control indicated at 35, it being understood however that the same or similar results can be readily obtained by a connection "in parallel" without departing from the spirit of the invention. Consequently any change in resistance in the rheostat 23 will necessarily vary the resistance of the volume control circuit and vary the strength of the signal emanating from the amplifier, indicated at 35a.

Thus it will be seen that the radial position of the pin 27 in the disc 25 will determine the instant at which the contacting face 34 will engage the said pin to move the control arm 24 and effect a change in the amount of current passing through the resistance element 23. For example, if the windows of the automobile are closed, it is not necessary for the automatic volume control to begin operating until the speed of the vehicle is relatively high. Consequently the pin 27 is adjusted radially, by movement of the knob 31, until it occupies a position at the extreme outer end of the radial slot 26, or at a point most distant from the center of the stub shaft 15, so that it will not be engaged by the bearing face 34 until the disc 32 has been rotated through a relatively large angle.

If the windows of the automobile are open and the rushing air noises or noises from any other extraneous causes interfere with the signals emanating from the radio receiver, at lower speeds than before, the pin 27 is moved radially to occupy a position closest to the center of the stub shaft 15, in which position the pin 27 will be engaged by the bearing face 34 when only a slight relative angular rotation of the disc 32 occurs.

While the improvements in the present invention have been described as applied to a conventional radio receiver for automobiles, it is to be understood that the invention is not necessarily limited to such particular application, as it may be incorporated in receivers of widely different types of physical construction and electrical design, and that the form of the means for carrying it out may be variously modified without departing from the spirit and scope of the invention.

For example, Figures 5 and 6 illustrate different applications of the volume control, Figure 5 showing the depending arm 16a connected to an engine driven governor arrangement, generally illustrated by the numeral 36, through the medium of a bell crank lever 37. From the foregoing it will be apparent that as the speed of rotation of the driving shaft 38 increases, the balls 39 of the governor, in moving outwardly in response to centrifugal force, will operate the bell crank lever 37 and move the arm 16a in the direction of arrow B.

In Figure 6 the depending arm 16b of the volume control is operatively connected to the engine throttle control through suitable linkages, generally indicated by the numeral 40. Consequently as the accelerator pedal 41 is depressed to increase the speed of the engine, the depending arm 16b will be moved in the direction of the arrow C and operate the volume control.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the general results outlined, and the invention extends to such use.

For example, it is readily apparent that the discs 25 and 32 need not be in fixed axial relationship with respect to one another but may be so mounted as to be movable into eccentric relationship in order to obtain differential angular rotation between the driving and driven members. It will also be understood that the device may be modified to the extent that the pin 27 may be fixed to the disc 25, instead of being radially movable relative thereto, and achieve similar results by mounting the shaft 22, disc 25 and resistance unit 23 in suitable guides to effect variable eccentricity between the two discs, said eccentric positioning being obtained by means of the dash control herein used in effecting radial positioning of the pin 27, and that the claims are to be so interpreted.

What I claim is:

1. In a variable electrical resistance unit of the class described, the combination of a driven member connected to the resistance unit, an angularly displaceable driving member for the driven member, an adjustable element carried by the driven member, said element engageable by the driving member upon angular displacement thereof but normally disengaged from said driving member, and means, manually operable at a distant point from the element, to adjust said element in relation to the driving member to vary the amount of angular displacement required of said driving member to engage the element to vary the resistance of the resistance unit.

2. In a device of the class described, the combination of a driven member, means to operate the driven member, adjustable means interposed between the member and the operating means to effect a driving connection therebetween, and means, comprising a remotely operable push-pull cable device to position the adjustable means at any point along its path of adjustment, irrespective of operation of the operating means, to cause the operating means to drive the member varying extents, depending upon the position of said adjustable means.

3. A volume control for the radio receiver of a moving vehicle comprising, a primary shaft movable through a given angular range, a secondary shaft in axial alignment with said primary shaft, a variable resistance element adapted for being electrically conected to said receiver, and having a control arm movable with said secondary shaft, driving means interposed between said shafts permitting relative angular displacement therebetween, and adjustable means associated with said last mentioned means limiting the extent of relative angular displacement between said primary and secondary shafts.

4. A volume control for the radio receiver of a moving vehicle comprising, a primary shaft movable through a given angular range, a secondary shaft in axial alignment with said primary shaft, a variable resistance element adapted for being electrically connected to said receiver, and having a control arm movable with said secondary shaft, a driving means interposed between said shafts permitting relative angular displacement therebetween, and remotely controlled adjustable means associated with last said mentioned means limiting the extent of relative angular displacement between said primary and secondary shafts.

5. An automatic volume control for the radio receiver of a moving vehicle compriing, a primary shaft having a driving part, a fluid driven vane for moving said primary shaft through a given range of angular movement, a secondary shaft having a driven part in axial alignment with said driving part, a variable resistance element adapted for being electrically connected to said radio receiver, and having a control arm movable with said secondary shaft, a disc attached to the one end of said secondary shaft having a slot therein, a second disc attached to said primary shaft and positioned adjacent said first mentioned disc and provided with a contacting surface, and a pin mounted in said slot adapted for being engaged by said contacting surface to move said secondary shaft in unison with said primary shaft upon movement of said primary shaft beyond a predetermined angle.

6. An automatic volume control for the radio receiver of a moving vehicle comprising, a primary shaft having a driving part, a fluid driven vane for moving said primary shaft through a given range of angular movement, a secondary shaft having a driven part in axial alignment with said driving part, a variable resistance element adapted for being electrically connected to said radio receiver, and having a control arm movable with said secondary shaft, a disc attached to the one end of said secondary shaft having a radially arranged slot provided therein, a second disc positioned on said primary shaft adjacent said first mentioned disc, said second disc being provided with a camming surface, and a pin mounted in said slot adapted for being engaged by said camming surface, said pin being adjustable radially in said slot to obtain active engagement between said pin and slot upon angular displacement of said primary shaft through any predetermined angle.

7. An automatic volume control for the radio receiver of a moving vehicle comprising, a primary shaft having a driving part, a fluid driven vane for moving said primary shaft through a given range of angular movement, a secondary shaft having a driven part in axial alignment with said driving part, a variable resistance element adapted for being electrically connected to said radio receiver, and having a control arm movable with said secondary shaft, a disc attached to the one end of said secondary shaft having a radially arranged slot provided therein, a second disc positioned on said primary shaft adjacent said first mentioned disc, said second disc being provided with a camming surface, and a pin mounted in said slot adapted for being engaged by said camming surface, said pin being adjustable radially in said slot to obtain active engagement between said pin and slot upon angular displacement of said primary shaft through any predetermined angle, and remotely operated means for controlling the radial position of said pin in said slot.

8. In a variable electrical resistance unit comprising a movable contact arm, the combination of a fluid operated driving member, a driven member adjacent the driving member and connected to the arm, an adjustable element carried by the driven member, and an aperture in the driving member, said aperture having a camming surface cooperating with the adjustable element to form a variable connection between said driving and said driven members to move the arm varying distances depending upon the adjustment of the element.

9. In a variable electrical resistance unit including a rotatable contact arm, the combination of a driven member connected to the contact arm, a fluid operated driving member adjacent the driven member, a pin adjustably mounted on the driven member, an aperture in the driving member, said aperture forming a camming surface adapted to cooperate with the pin to effect a driving connection between said driving and said driven members, and means to adjust the pin in relation to the camming surface to vary the connection between the driving and the driven members to move the arm varying distances depending upon the adjustment of the pin.

10. In a variable electrical resistance unit comprising a slidable contact arm yieldingly urged in one direction into engagement with a stop, the combination of a driving member to urge the contact arm in the opposite direction, a driven member connected to the arm, means to actuate the driving member, an aperture in the driving member, one wall of said aperture forming a camming surface, an element slidably mounted on the driven member, said element cooperating with the camming surface to effect an operating connection between the driving and the driven members, and means to slide the element in relation to the camming surface to vary the connection between the driving and the driven members to control the movement of the contact arm.

11. In a device of the character described, the combination with an electrical resistance element, and a movable contact arm cooperating with the resistance element to regulate the resistance thereof, of a driven member connected to the arm, an inconstant driving means for the driven member, an aperture in the driving means, said aperture forming a camming surface, a part adjustably mounted on the driven member and engageable by the camming surface to effect an operating connection between the driven member and the driving means, and means to position the part opposite any point along the path of the camming surface to predetermine the moment of engagement of the camming surface with the part to regulate the resistance of the resistance element.

12. In a radio receiver for a motor vehicle, the combination of a variable electrical resistance element comprising a movable contact arm, to control the volume of the output of the radio receiver, driving means for the contact arm, said driving means disposed in the airstream of the vehicle and operated by said airstream to adjust said contact arm in relation to the velocity of the airstream to control the volume of the radio receiver, and means including an adjustable part and remote control means for adjusting same, irrespective of whether or not the driving means is functioning, to connect the driving means to the contact arm, the position of said adjustable part adapted to determine the extent of movement imparted to the contact arm by the driving means.

13. In a radio receiver for a motor vehicle, the combination of a variable electrical resistance element comprising a movable contact arm to control the volume of the output of the radio receiver, a driven member connected to the contact arm, a driving member, means to displace the driving member angularly in proportion to the speed of the motor, and an adjustable part connected to the driven member and engageable by the driving member to transmit the angular displacement of the driving member to the contact arm to control the volume of the radio receiver, the position of said adjustable part adapted to determine the moment of engagement between said part and the driving member.

14. In a device of the class described, the combination of a fluid operated driving member; a member adapted to be driven by the driving member; a camming surface on the driving member; a movable element mounted on the driven member and engageable by the camming surface, to form an operating connection between the driving and driven members; and remote control means, comprising a push-pull cable device, to move the element in relation to the camming surface to advance or retard the moment of engagement between said element and said camming surface, irrespective of operation of the driving member, to cause the driving member to move the driven member varying extents, depending upon the moment of engagement between the element and the camming surface.

15. In a device of the class described, the combination of a primary shaft; a fluid operated pendulum integral with the primary shaft and adapted to angularly displace said primary shaft varying extents, depending upon the velocity of the fluid; a secondary shaft adapted to be moved through any portion of its operating range, by the primary shaft; a member on the primary shaft, having a camming surface thereon; a member on the secondary shaft, having an adjustable element mounted thereon, said element engageable by the camming surface to form an operating connection between the primary and secondary shafts; and remote control means to position the element at any point along its path of adjustment to cause the primary shaft to move the secondary shaft through varying extents of its operating range, depending upon the adjustment of the element.

MENDEL N. PACK.